(12) United States Patent
Brausse et al.

(10) Patent No.: US 10,259,304 B2
(45) Date of Patent: Apr. 16, 2019

(54) BATTERY HOUSING OF A TRACTION BATTERY OF A MOTOR VEHICLE

(71) Applicant: Dr. Ing. h.c. F. Porsche Aktiengesellschaft, Stuttgart (DE)

(72) Inventors: Stephan Brausse, Eningen (DE); Philipp Heinz, Weil der Stadt (DE); Michael Raciti, Mühlacker (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 50 days.

(21) Appl. No.: 15/617,422

(22) Filed: Jun. 8, 2017

(65) Prior Publication Data

US 2017/0355255 A1 Dec. 14, 2017

(30) Foreign Application Priority Data

Jun. 13, 2016 (DE) .......................... 10 2016 110 787

(51) Int. Cl.
*B60K 1/04* (2019.01)
*B62D 21/15* (2006.01)
(Continued)

(52) U.S. Cl.
CPC .............. *B60K 1/04* (2013.01); *B62D 21/157* (2013.01); *B62D 25/2036* (2013.01);
(Continued)

(58) Field of Classification Search
CPC . B60K 1/04; B60K 2001/0438; B62D 21/157
See application file for complete search history.

(56) References Cited

U.S. PATENT DOCUMENTS 8,608,230 B2 * 12/2013 Young ...................... B60K 1/04
296/187.02
8,919,473 B2 * 12/2014 Bisror ................... B60N 2/005
180/68.5
(Continued)

FOREIGN PATENT DOCUMENTS

EP 2505458 A1 10/2012
JP H0781625 A 3/1995
(Continued)

OTHER PUBLICATIONS

Notification of Reason for Rejection for Japanese Application No. 2017-114560, dated Aug. 7, 2018, 4 pages.

*Primary Examiner* — Katy M Ebner
(74) *Attorney, Agent, or Firm* — RatnerPrestia (57) ABSTRACT

A battery housing of a motor vehicle traction battery includes at least one base plate, and two side walls which extend parallel to each other in the longitudinal direction of the motor vehicle and are spaced apart from each other in the transverse direction of the motor vehicle. Formed between the side walls is a number of receiving spaces, within each of which at least one battery module of the traction battery of the motor vehicle is accommodated. A plurality of deformation elements which are spaced apart from one another in the longitudinal direction of the motor vehicle are attached to the inner sides of the side walls. The battery modules are arranged in the receiving spaces in such a manner that, in the region of the deformation elements, lateral deformation spaces are formed between the battery modules and the side walls.

12 Claims, 5 Drawing Sheets

(51) Int. Cl.
    *B62D 25/20*     (2006.01)
    *B62D 27/02*     (2006.01)

(52) U.S. Cl.
    CPC .... *B62D 27/023* (2013.01); *B60K 2001/0438* (2013.01); *B60Y 2306/01* (2013.01)

(56) References Cited

U.S. PATENT DOCUMENTS

| | | | |
|---|---|---|---|
| 8,939,246 B2* | 1/2015 | Yamaguchi | B60K 1/04 180/311 |
| 8,967,312 B2* | 3/2015 | Yanagi | B60K 1/04 180/68.5 |
| 9,862,419 B2* | 1/2018 | Kido | B60K 1/04 |
| 9,908,431 B2* | 3/2018 | Kirk | H01M 2/1077 |
| 9,937,818 B2* | 4/2018 | Newman | B60L 11/1879 |
| 9,987,913 B2* | 6/2018 | Hara | B60K 1/04 |
| 2010/0264699 A1 | 10/2010 | Wang | |
| 2012/0009008 A1* | 1/2012 | Hodoya | B23K 31/022 403/188 |
| 2013/0229030 A1 | 9/2013 | Yamaguchi | |
| 2017/0029034 A1* | 2/2017 | Faruque | B60K 1/04 |
| 2017/0120951 A1* | 5/2017 | Ashraf | B62D 21/03 |
| 2018/0050607 A1* | 2/2018 | Matecki | B60K 1/04 |
| 2018/0154754 A1* | 6/2018 | Rowley | B60K 1/04 |
| 2018/0201109 A1* | 7/2018 | Brausse | B60K 1/04 |
| 2018/0212216 A1* | 7/2018 | Handing | H01M 2/10 |
| 2018/0312200 A1* | 11/2018 | Kawase | B62D 21/157 |

FOREIGN PATENT DOCUMENTS

| | | | |
|---|---|---|---|
| JP | 2013256265 A | 12/2013 | |
| JP | 2015150927 A | 8/2015 | |

* cited by examiner

BATTERY HOUSING OF A TRACTION BATTERY OF A MOTOR VEHICLE

CROSS-REFERENCE TO RELATED APPLICATIONS

This application claims priority to German Patent Application No. 102016110787.5, filed Jun. 13, 2016, the content of such application being incorporated by reference herein in its entirety.

FIELD OF THE INVENTION

The present invention relates to a battery housing of a traction battery of a motor vehicle, the traction battery being integrated in an underbody structure of the motor vehicle, comprising at least one base plate, and two side walls which extend parallel to each other in the longitudinal direction of the motor vehicle and are spaced apart from each other in the transverse direction of the motor vehicle, wherein formed between the side walls is a number of receiving spaces, within each of which at least one battery module of the traction battery of the motor vehicle is accommodated.

BACKGROUND OF THE INVENTION

Motor vehicles which comprise an electric engine as the driving device instead of an internal combustion engine or in addition to an internal combustion engine have a "traction battery" in order to be able to supply the electric engine with electrical energy during operation. The traction battery is designed as a high voltage battery and comprises a multiplicity of rechargeable battery modules which are accommodated in a battery housing and are electrically connected to one another. The battery housing with the battery modules of the traction battery accommodated therein can be arranged within the motor vehicle in different ways. One possible accommodating location is, for example, an underbody structure of the motor vehicle.

In the event of a crash, in particular in a side impact, there is the problem that the battery modules of the traction battery that are accommodated within the battery housing may under some circumstances become damaged because of the high mechanical loads, and therefore, for example, electrolytic fluids may escape out of the battery modules. Therefore, a very wide variety of measures have already been taken in the prior art to protect the modules from damage in the event of a crash. The measures include, inter alia, battery housings which are of mechanically particularly stable design or—as known, for example, from EP 2 505 458 A1, which is incorporated by reference herein,—additional protective components of the battery modules. Underbody structures which likewise provide protection for the battery modules of traction batteries in the event of a crash are known from US 2010/0264699 A1, which is incorporated by reference herein, and from US 2013/0229030 A1, which is incorporated by reference herein. In the case of the underbody structure disclosed in the last-mentioned document, a frame structure is provided which protects the battery modules of the traction battery that are accommodated in the receiving space against damage in the event of a crash.

SUMMARY OF THE INVENTION

Described herein is a battery housing of a traction battery of a motor vehicle that offers particularly effective protection of the battery modules in the event of a crash.

A battery housing according to aspects of the invention is distinguished in that a plurality of deformation elements which are spaced apart from one another in the longitudinal direction of the motor vehicle are attached to the inner sides of the side walls, and the battery modules are arranged in the receiving spaces in such a manner that, in the region of the deformation elements, lateral deformation spaces are formed between the battery modules and the side walls.

The battery housing is based on the concept of creating defined deformation spaces between the battery modules and the inner sides of the side walls of the battery housing and of providing deformation elements therein, which, in the event of a crash, can be deformed and, in the process, can absorb energy. It is therefore avoided in an advantageous manner that the battery modules themselves lie directly against the side walls of the battery housing. The side walls themselves are preferably designed as extruded profiles. The risk of damage to the battery modules in the event of a crash, in particular in a side impact, can be effectively reduced by the measures according to aspects of the invention. The battery housing can preferably be screwed to the underbody structure of the motor vehicle and can thereby be integrated in the underbody structure. As an alternative, it is also possible for the battery housing to be formed integrally with the underbody structure of the motor vehicle.

In a preferred embodiment, it is proposed that each of the receiving spaces comprises two transverse profiles which extend parallel to each other in the transverse direction of the motor vehicle and are spaced apart from each other in the longitudinal direction of the motor vehicle, wherein at least one of the transverse profiles is connected to one of the deformation elements. In other words, in this embodiment, two adjacent transverse profiles therefore each bound one of the receiving spaces. The transverse profiles serve here in particular to increase the mechanical stability of the battery housing. Owing to the fact that the deformation elements are connected to the transverse profiles, assemblies having heterogeneous rheological properties can be created since it is possible for the deformation elements to have different rheological properties than the transverse profiles. For example, the deformation elements can have a lower degree of rigidity than the transverse profiles. By adjustment of the rheological properties of the transverse profiles and of the deformation elements, the mechanical behavior of the battery housing in the event of a crash, in particular in a side impact, can be adapted in a specific manner. In the preferred embodiment, a transverse profile of the first and last receiving space in the longitudinal direction of the motor vehicle is in each case connected here to one of the deformation elements, whereas, in all of the other receiving spaces, the two transverse profiles are connected to one deformation element each.

In order to simplify the installation of the deformation elements, it can be provided, in a particularly preferred embodiment, that at least some of the deformation elements have a holding portion which is shaped in such a manner that it can engage in a receiving opening at a free end of one of the transverse profiles. The holding portions can preferably be accommodated in a form-fitting manner in the receiving openings assigned thereto in the transverse profiles.

In an alternative embodiment, there is also the possibility that at least some of the deformation elements have a holding portion which is shaped in such a manner that it can reach in sections over a free end of one of the transverse profiles. The possibility is thereby created in an advantageous manner of, during the manufacturing or installation, compensating for any component tolerances which are present.

In order to achieve secure holding of the deformation elements on the transverse profiles, it can be provided, in an advantageous embodiment, that the deformation elements are connected in sections in an integrally bonded manner to the transverse profiles. The deformation elements can preferably be welded in sections to the transverse profiles.

In an advantageous development, it is proposed that at least some of the deformation elements have a fastening portion which is designed in such a manner that one or two battery modules can be fastened in sections thereto. The possibility is thereby created of fastening one or more battery modules directly to the deformation elements while retaining the lateral deformation spaces. A direct connection of the deformation elements to the transverse profiles is advantageously not required here.

In a particularly advantageous embodiment, it can be provided that each of the deformation elements has a supporting portion which extends transversely with respect to the holding portion and/or to the fastening portion and is connected to the inner side of one of the side walls. The supporting portion of the deformation elements is preferably designed in such a manner that it permits a secure support of the deformation element on the inner side of one of the side walls of the battery housing. The supporting portion here has in particular a length extent which provides effective support of the deformation element on the inner side of one of the side walls of the battery housing. The supporting portion can extend over the entire height of one of the side walls of the battery housing or alternatively only partially over the entire height of the relevant side wall.

In order to achieve a secure holding of the supporting portion, the supporting portion can preferably be connected in an integrally bonded manner to one of the side walls of the battery housing. Each of the supporting portions can in particular be welded to one of the side walls. What are referred to as step-welded joints have proven particularly expedient here. Of course, other joining techniques are also possible, for example screwing or riveting.

For improved deformation behavior of the deformation elements, it is proposed, in a particularly preferred embodiment, that each of the deformation elements has two connecting portions which extend between the holding portion and/or the fastening portion and the supporting portion obliquely with respect to the plane of the supporting portion. The supporting portion and the two connecting portions which lead into the holding portion and/or into the fastening portion of the deformation element can in particular form an open triangular cross-sectional shape. The design of the deformation elements can be adapted here in a specific manner to the desired deformation behavior of the deformation elements.

In a particularly preferred embodiment, it can be provided that the deformation elements are designed as extruded profile parts. As a result, it is possible, for example, to create even more complex designs of the deformation elements, wherein, nevertheless, the tool costs for the production of the deformation element can be relatively low.

In order to permit effective cooling of the battery modules during operation, it is proposed, in an advantageous development, that one or more cooling devices for cooling the battery modules are arranged below the base plate.

BRIEF DESCRIPTION OF THE DRAWINGS

Further features and advantages of the present invention become clear on the basis of the description below of preferred exemplary embodiments with reference to the attached figures, in which.

DETAILED DESCRIPTION OF THE INVENTION

With reference to FIGS. 1 to 4, a battery housing 1 of a traction battery of a motor vehicle, said battery housing being designed according to a first exemplary embodiment of the present invention and within which a plurality of battery modules 10 of the traction battery can be accommodated, comprises a base plate 2 and two side walls 3 which extend parallel to each other in the longitudinal direction (x direction) of the motor vehicle and are spaced apart from each other in the transverse direction (y direction) of the motor vehicle. Only one of said two side walls 3, which can be designed, for example, as extruded profiles, can be seen in the figures. This is the side wall 3 which is provided on a right side of the vehicle in the forward direction of travel of the motor vehicle, which has been symbolized in FIG. 2 by an arrow tip of the x axis of the Cartesian system of co-ordinates.

Figure 1:
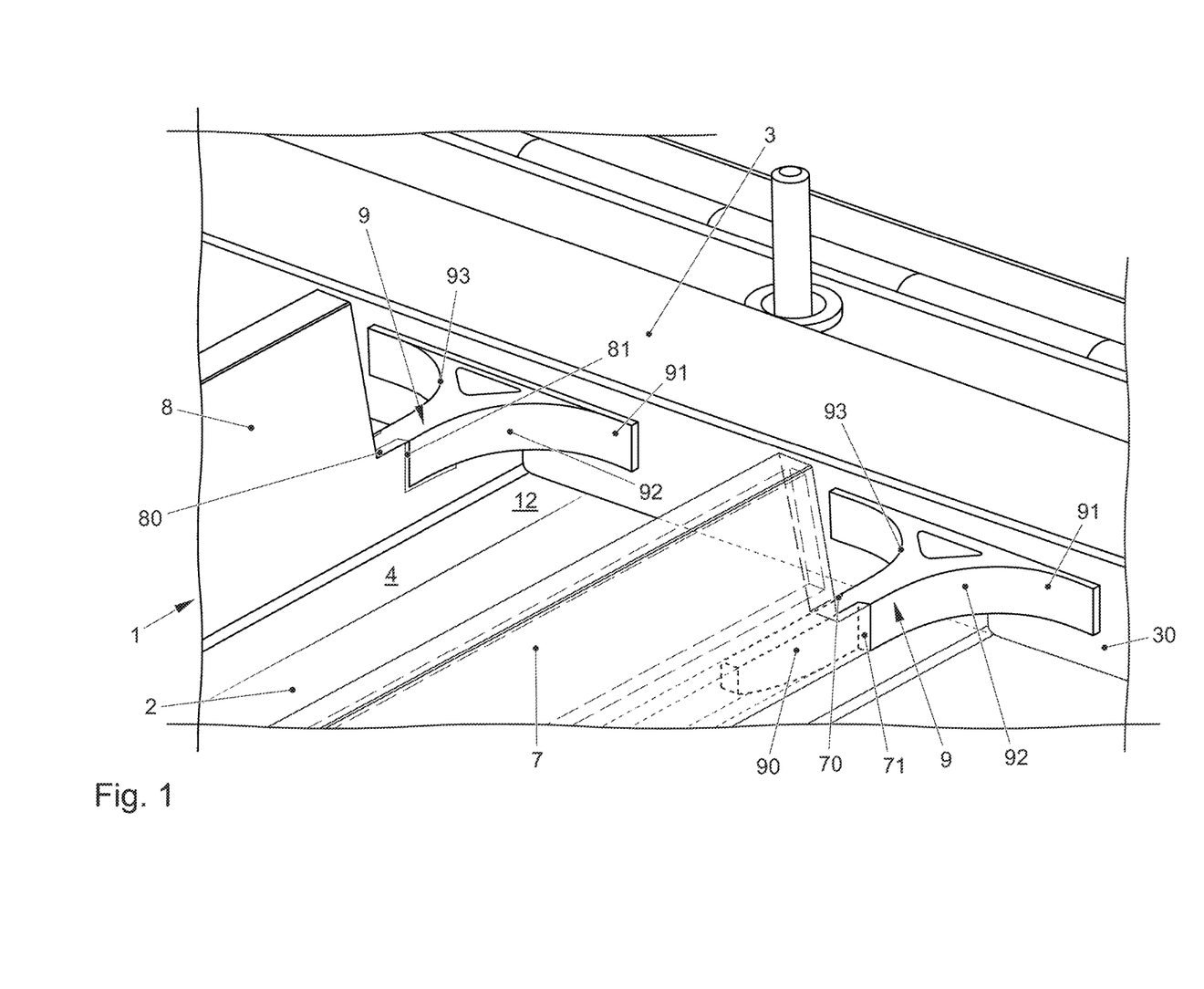
FIG. 1 shows a perspective view of part of a battery housing of a traction battery of a motor vehicle, said battery housing being designed according to a preferred exemplary embodiment of the present invention.
Figure 2:
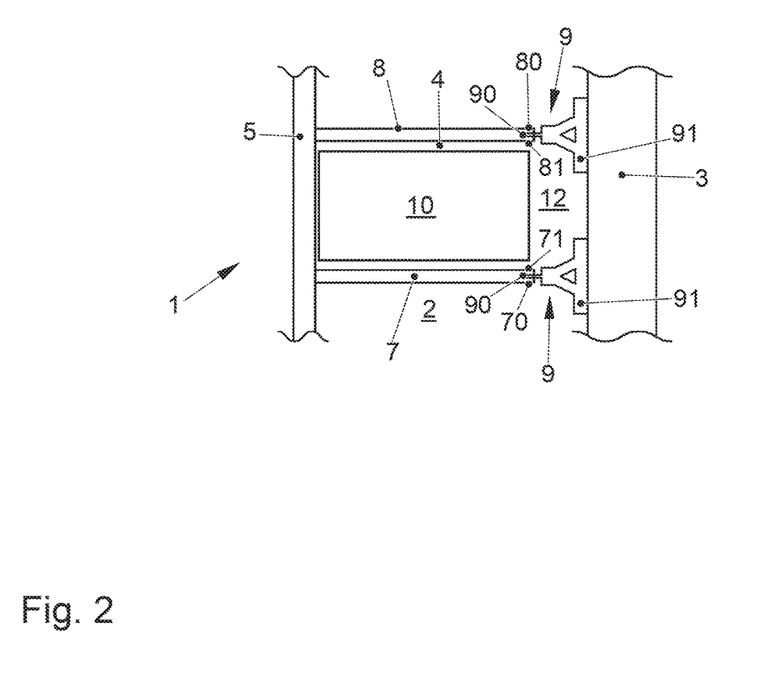
FIG. 2 shows a top view of the battery housing according to FIG. 1.

The battery housing 1 has a number of receiving spaces 4, within each of which at least one battery module 10 of a traction battery of the motor vehicle can be accommodated. FIG. 2 shows an example of one of said receiving spaces 4 in its entirety. One or more receiving spaces 4 for at least one battery module 10 of the traction battery each can be formed on the left side, as viewed in the direction of travel. For example, four receiving spaces 4 can be formed in the battery housing 1, wherein in each case two receiving spaces 4 can be arranged one behind the other in the longitudinal direction of the vehicle (x direction) and two receiving spaces 4 can be arranged next to each other in the transverse direction of the vehicle (y direction).

Each of said receiving spaces 4 is bounded laterally by a partial portion of the right or left side wall 3, a partial portion of a longitudinal profile 5, which is arranged spaced apart from the right or left side wall 3 in the transverse direction (y direction) and extends parallel to said partial portion in the longitudinal direction (x direction) of the motor vehicle, and two transverse profiles 7, 8 which extend between the right or left side wall 3 and the longitudinal profile 5 in the transverse direction of the motor vehicle. The two transverse profiles 7, 8 likewise extend parallel to each other and are arranged spaced apart from each other in the longitudinal direction of the motor vehicle. If the battery housing 1 has more than two such transverse profiles 7, 8 which are spaced apart from each other in the longitudinal direction and are arranged in the above-described manner between the right or left side wall 3 and the longitudinal profile 5, a plurality of receiving spaces 4 for the battery modules 100 can be provided which are each separated from one another by a common transverse profile 3, 4. A partial region of the base plate 2, which region is laterally bounded by the partial portions of the right or left side wall 3 and of the longitudinal profile 5 and the two transverse profiles 7, 8, closes off the receiving spaces 4 in each case downward. One or more cooling devices, in particular cooling lines, through which a cooling fluid can be conducted, can preferably be provided below the base plate 2, said cooling devices being configured to cool the battery modules 10 of the traction battery during operation.

Each of the transverse profiles 7, 8 shown in FIGS. 1 to 4 is fastened to the side wall 3 assigned thereto of the battery housing 1 with the aid of a deformation element 9. To further clarify the connection of the deformation elements 9 to the transverse profiles 7, 8, a first transverse profile 7 has been very deliberately illustrated transparently in FIG. 1. Each of the transverse profiles 7, 8 includes a receiving opening 71, 81 at a free end 70, 80 facing in the direction of the side wall 3 assigned thereto. As can be seen, for example, in FIG. 3, the deformation elements 9 have a holding portion 90 and a flat supporting portion 91 which extends transversely with respect thereto, said holding portion and supporting portion being connected to each other via two connecting portions 92, 93 extending obliquely with respect to the plane of the supporting portion 91. The deformation elements 9 therefore have an open triangular cross-sectional shape in sections. The supporting portion 91, in particular because of its longitudinal extent, provides effective support of the deformation element 9 on an inner side 30 of the side wall 3 and can extend over the entire height of the side wall 3 or alternatively only partially over the entire height of the side wall 3.

Figure 3:
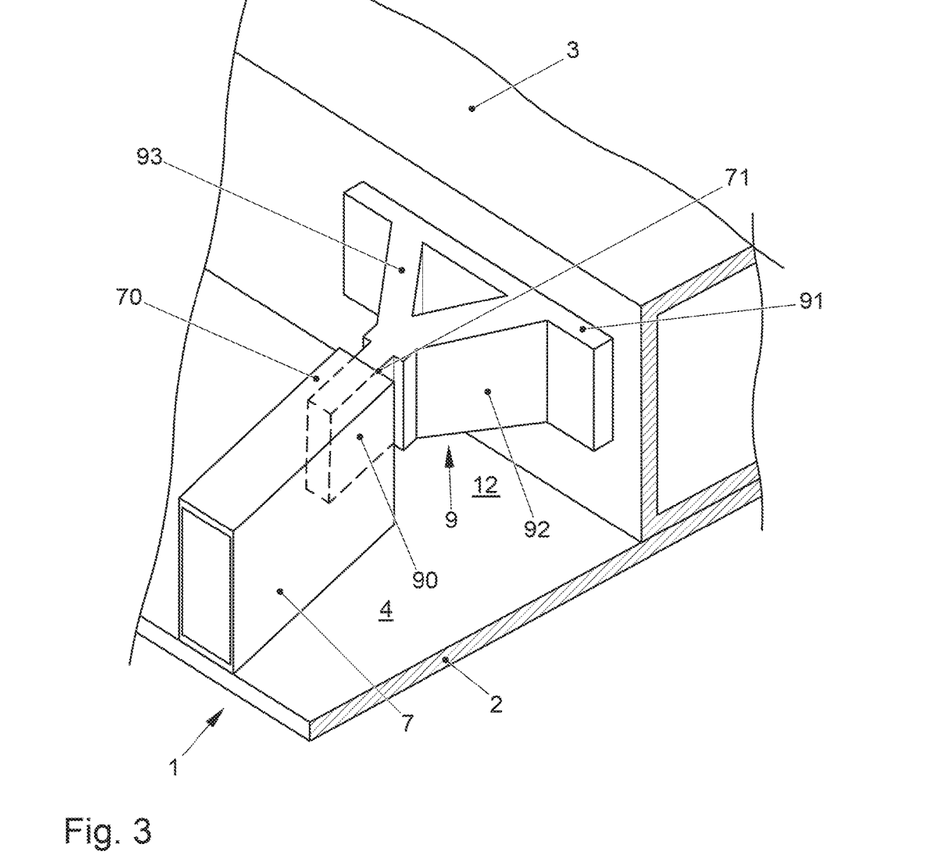
FIG. 3 shows a perspective, partially transparent illustration which shows the connection of a transverse profile to a side wall of the battery housing by means of a deformation element.
Figure 4:
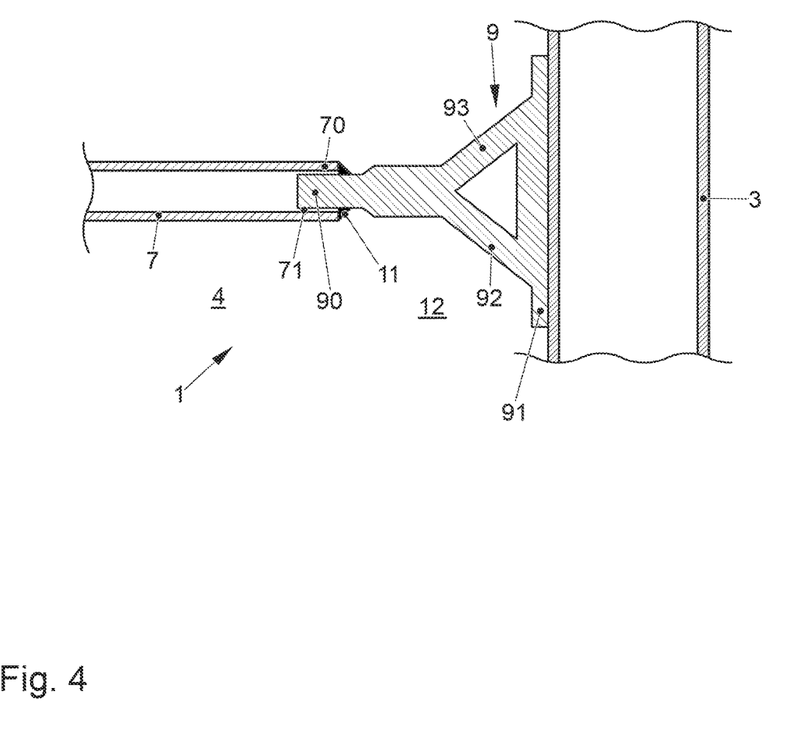
FIG. 4 shows a sectioned top view which shows the connection of the transverse profile to the side wall.

The holding portion 90 of each deformation element 9 can be shaped in sections in such a manner that it can be inserted in a form-fitting manner into one of the receiving openings 71, 81 of the transverse profiles 7, 8 during installation. After the insertion into the receiving opening 71, 81, the holding portion 90 can be connected in an integrally bonded manner to the transverse profile 7, 8 by an integrally bonded connection, in particular by a welded joint 11. Alternatively, the holding portion 90 of each deformation element 9 can also be designed in such a manner that it can engage in sections around the free end 70, 80 of the transverse profile 7, 8 assigned thereto. As a result, the possibility is created in an advantageous manner of, during the installation, compensating for any component tolerances which are present. Also in this embodiment, the holding portion 90 is preferably welded to the transverse profile 7, 8 after the manufacturing or installation.

The mechanical connection of the deformation elements 9 to the inner side 30 of one of the side walls 3 of the battery housing 1 preferably likewise takes place by means of integrally bonded connections, in particular by welded joints. The supporting portion 91 of each deformation element 9 is welded here to the inner side 30 of the relevant side wall 3. In this connection, what are referred to as stepwelded joints have proven particularly expedient.

The deformation elements 9 preferably have different rheological properties, in particular a different degree of rigidity, than the transverses profiles 7, 8 to which they are connected. The deformation elements 9 can preferably have a lower degree of rigidity than the transverse profiles 7, 8. In a particularly advantageous embodiment, the deformation elements 9 can be designed as extruded profile parts, and therefore even more complex designs can be produced in a simple and cost-effective manner. By means of a defined adjustment of the rheological properties of the transverse profiles 7, 8 and of the deformation elements 9, the mechanical behavior of the battery housing 1 can be adapted in a specific manner in the event of a crash, in particular in a side impact.

As can be seen in FIG. 2, during the installation, the battery module 10 is positioned in the receiving space 4 between the transverse profiles 7, 8, the longitudinal profile 5 and the side wall 3 in such a manner that it protrudes as far as the ends 17, 18 of the transverse profiles 3, 4. In this manner, in the region of the deformation elements 9, a respective deformation space 12 is created between the outer end of the battery module 10 and the side wall 3 of the battery housing 1 of the motor vehicle. It is thereby prevented that the battery module 10 lies on the end side directly against the side wall 3; rather, the battery module is spaced apart from the latter in the transverse direction of the vehicle (y direction). In a corresponding manner, the other battery modules 10 are also arranged in the receiving spaces 4 assigned thereto of the battery housing 1, and therefore they are likewise spaced apart from the side walls 3.

It has been shown that, by providing defined deformation spaces 12 in the region of the deformation elements 9 between the battery modules 10 and the side walls 3 of the battery housing 1, the battery modules 10 can be particularly reliably protected from damage in particular in the event of a side impact. Furthermore, the supporting portions 91 of the deformation elements 9 permit improved support of the transverse profiles 7, 8 on the side walls 3 of the battery housing 1.

Figure 5:
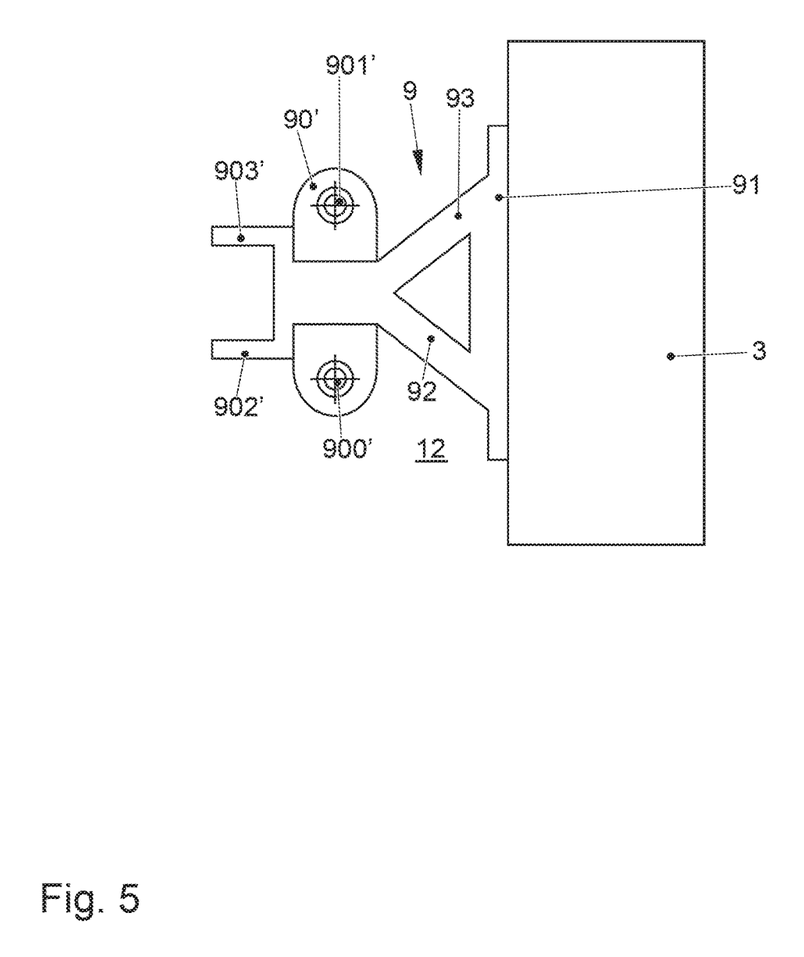
FIG. 5 shows a top view which shows an alternative variant embodiment of the deformation element which is connected to a side wall.

An alternative variant embodiment of the deformation elements 9 will be explained in more detail below with reference to FIG. 5. The deformation elements 9 each have a fastening portion 90' which is designed in such a manner that two battery modules 10 which are adjacent in the longitudinal direction of the motor vehicle can be fastened in sections thereto. The fastening portion 90' has two bores 900', 901' through which one fastening screw can be guided in each case. The fastening portion 90' at its free end has two holding limbs 902', 903' which are designed in such a manner that they can, for example, interlock in each case with a battery module 10. The two battery modules 10 which are adjacent in the longitudinal direction of the motor vehicle are each fastened in a corner region to the fastening portion 90' by means of a fastening screw.

The battery housing 1 can preferably be screwed to the underbody structure of the motor vehicle and can thereby be integrated in the underbody structure 1. Alternatively, it is also possible for the battery housing 1 to be formed integrally with the underbody structure of the motor vehicle.

What is claimed is:

1. A battery housing of a traction battery of a motor vehicle, the traction battery integrated in an underbody structure of the motor vehicle, the battery housing comprising:
   at least one base plate,
   two side walls which extend parallel to each other in a longitudinal direction of the motor vehicle and are spaced apart from each other in a transverse direction of the motor vehicle, receiving spaces formed between the side walls, wherein at least one battery module of the traction battery of the motor vehicle is accommodated in each receiving space, a plurality of deformation elements which are spaced apart from one another in the longitudinal direction of the motor vehicle are attached to inner sides of the side walls, and two transverse elements which extend parallel to each other in the transverse direction of the motor vehicle and are spaced apart from each other in the longitudinal direction of the motor vehicle, wherein each transverse element is connected to one of the deformation elements, and wherein each deformation element has a lower degree of rigidity than the transverse element to which the deformation element is connected such that, in an event of impact, the deformation element deforms before the transverse element, wherein the battery modules are arranged in the receiving spaces in such a manner that, in a region of the deformation elements, lateral deformation spaces are formed between the battery modules and the side walls.

2. The battery housing as claimed in claim 1, wherein each of the receiving spaces comprises two of the transverse elements.

3. The battery housing as claimed in claim 1, wherein at least one of the deformation elements has a holding portion which is shaped to engage in a receiving opening at a free end of one of the transverse elements.

4. The battery housing as claimed in claim 1, wherein at least one of the deformation elements has a holding portion which is shaped to extend beyond a free end of one of the transverse elements.

5. The battery housing as claimed in claim 1, wherein the deformation elements are connected in an integrally bonded manner to the transverse elements.

6. The battery housing as claimed in claim 3, wherein at least one of the deformation elements has a fastening portion which is configured to be fastened to at least one battery module.

7. The battery housing as claimed in claim 6, wherein each of the deformation elements has a supporting portion which extends transversely with respect to the holding portion or with respect to the fastening portion, and the supporting portion is connected to the inner side of one of the side walls of the battery housing.

8. The battery housing as claimed in claim 7, wherein the supporting portion is connected in an integrally bonded manner to the inner side of one of the side walls of the battery housing.

9. The battery housing as claimed in claim 7, wherein each of the deformation elements has two connecting portions which extend between (i) the holding portion or the fastening portion and (ii) the supporting portion, and each of the deformation elements extends obliquely with respect to the plane of the supporting portion.

10. The battery housing as claimed in claim 1, wherein the deformation elements are extruded profile parts.

11. The battery housing as claimed in claim 1, wherein the deformation elements are spaced apart from one another along one of the two side walls.

12. The battery housing as claimed in claim 1, wherein at least one of the deformation elements has an open triangular cross-sectional shape.

* * * * *